(12) United States Patent
Winkler

(10) Patent No.: US 8,303,274 B2
(45) Date of Patent: Nov. 6, 2012

(54) MINIATURE FAN

(75) Inventor: Wolfgang Arno Winkler, St. Georgen (DE)

(73) Assignee: EBM-Papst St. Georgen GmbH & Co, KG, St. Georgen (DE)

( * ) Notice: Subject to any disclaimer, the term of this patent is extended or adjusted under 35 U.S.C. 154(b) by 467 days.

(21) Appl. No.: 12/333,389

(22) Filed: Dec. 12, 2008

(65) Prior Publication Data

US 2009/0155097 A1 Jun. 18, 2009

(30) Foreign Application Priority Data

Dec. 17, 2007 (DE) ............... 20 2007 018 178 U

(51) Int. Cl.
*F04D 25/08* (2006.01)
*F04D 25/06* (2006.01)

(52) U.S. Cl. .......... 417/423.7; 417/44.1; 417/353; 417/354; 417/423.1; 310/68 B; 310/71

(58) Field of Classification Search .......... 417/44.1, 417/353, 354, 423.1, 423.7; 310/68 B, 71, 310/156.05, 156.06, 67 R
See application file for complete search history.

(56) References Cited

U.S. PATENT DOCUMENTS

| | | | |
|---|---|---|---|
| 5,028,216 A | 7/1991 | Harmsen et al. | 417/354 |
| 5,176,509 A | 1/1993 | Schmider et al. | 417/423.7 |
| RE34,456 E | 11/1993 | Harmsen et al. | 417/354 |
| 5,925,948 A * | 7/1999 | Matsumoto | 310/67 R |
| 6,762,521 B2 | 7/2004 | Peter et al. | 310/89 |
| 6,830,440 B1 * | 12/2004 | Riddoch | 417/353 |
| 6,916,160 B2 * | 7/2005 | Obara | 417/354 |
| 7,023,291 B2 * | 4/2006 | Kato et al. | 331/158 |
| 2003/0183433 A1 * | 10/2003 | MacKelvie | 180/68.1 |
| 2005/0106046 A1 * | 5/2005 | Winkler | 417/423.3 |
| 2006/0153677 A1 | 7/2006 | Winkler et al. | 415/220 |

FOREIGN PATENT DOCUMENTS

| | | |
|---|---|---|
| DE | 33 40 292 A | 5/1984 |
| DE | 36 38 282 | 6/1987 |
| DE | 42 32 851 | 4/1993 |
| DE | 103 53 880 A | 6/2004 |
| DE | 20 2004 010890 | 11/2004 |
| GB | 2 260 861 | 4/1993 |

* cited by examiner

*Primary Examiner* — Devon Kramer
*Assistant Examiner* — Dominick L Plakkoottam
(74) *Attorney, Agent, or Firm* — Milton Oliver, Esq.; Oliver Intellectual Property LLC

(57) ABSTRACT

A miniature fan, particularly an axial fan, has a space-conserving structure which permits sophisticated electronic control circuits within a limited amount of space. It features an electronically commutated motor (ECM) including an internal stator 68, an external rotor 27 on a shaft 62, and a fan wheel 28 mounted on the rotor and bearing fan blades 26. The motor flange 40' supports a bearing tube 60 which rotatably journals the rotor shaft 62 and is formed with a cavity 84 which receives a first circuit board 86 devoted to control of motor speed and/or voltage, and a second circuit board 96 which supports a galvanometric sensor 100 which senses the rotational position of the rotor, for purposes of triggering commutation of the motor stator windings 68 at appropriate times.

4 Claims, 3 Drawing Sheets

MINIATURE FAN

CROSS-REFERENCE

This application claims priority from German Utility Model application DE 20 2007 018 178.7, filed 17 Dec. 2007, the disclosure of which is hereby incorporated by reference.

FIELD OF THE INVENTION

The invention relates to a miniature fan, and in particular to a miniature fan having improved electronic capabilities, e.g. rotation speed regulation or rotation direction reversal.

BACKGROUND

Miniature fans of this kind usually have a square fan housing as depicted in partial section in FIG. 1, and the dimension L (FIG. 1) can be, for example, 20, 25, 30, 40, 50, or 60 mm, so that a fan housing of this kind has sizes from approximately 20×20 mm to approximately 60×60 mm; for known miniature fans, the housing depth T is usually between 8 mm and 25 mm. The 20×20 mm and 25×25 mm sizes are ordinarily referred to as micro-fans or subminiature fans, and the 30×30 to 60×60 mm sizes as miniature fans, the terminology differing by company and by country.

Miniature fans of this kind have become very popular in numerous application sectors, for example in the fields of cooling of circuit boards or the cooling of components in which a high level of power dissipation occurs.

SUMMARY OF THE INVENTION

It is an object of the invention to make available a new miniature fan which has sufficient internal space for its control circuits.

According to the invention, this object is achieved by providing an internal stator with a stator winding arrangement, an external permanent-magnet rotor, and a fan wheel mounted on the rotor. In order to utilize space optimally, a mounting flange of the motor supports a bearing tube in which the central shaft of the external rotor is journaled, and the flange is formed with a cavity which receives a first circuit board with components which control motor voltage and/or direction and a second circuit board with a galvanometric sensor which detects the rotational position of the rotor for purposes of triggering commutation. A miniature fan having an enlarged component space is thus obtained, and, in this enlarged component space, it is possible to accommodate complex electronics, since it is possible in this fashion to accommodate two or more circuit boards, even in a miniature fan. The interface of the circuit boards to the motor can be limited to the galvanomagnetic sensor that senses the instantaneous position of the permanent-magnet arrangement, and to the electrical connections from at least one circuit board to the stator winding; this substantially simplifies assembly since, in a motor having, for example, only one winding strand, only two electrical connecting leads from that winding strand to a circuit board are required.

On the same principle, it is also possible to accommodate more than two circuit boards in (or in the region of) the fan flange(s). The depth T (FIG. 1) of the relevant fan is thereby increased, and that enables a larger axial extension of the fan blades—also referred to as "blade depth"—and thus a greater volumetric air flow rate (V/t) and a greater differential air pressure or "head" (Δp), with the overall result that a miniature fan having improved properties is obtained.

BRIEF FIGURE DESCRIPTION

Further details and advantageous refinements of the invention are evident from the exemplifying embodiments, in no way to be understood as a limitation of the invention, that are described below and depicted in the drawings, in which:

FIG. 1 serves to explain miniature fans and their problems;

DETAILED DESCRIPTION

Figure 1:
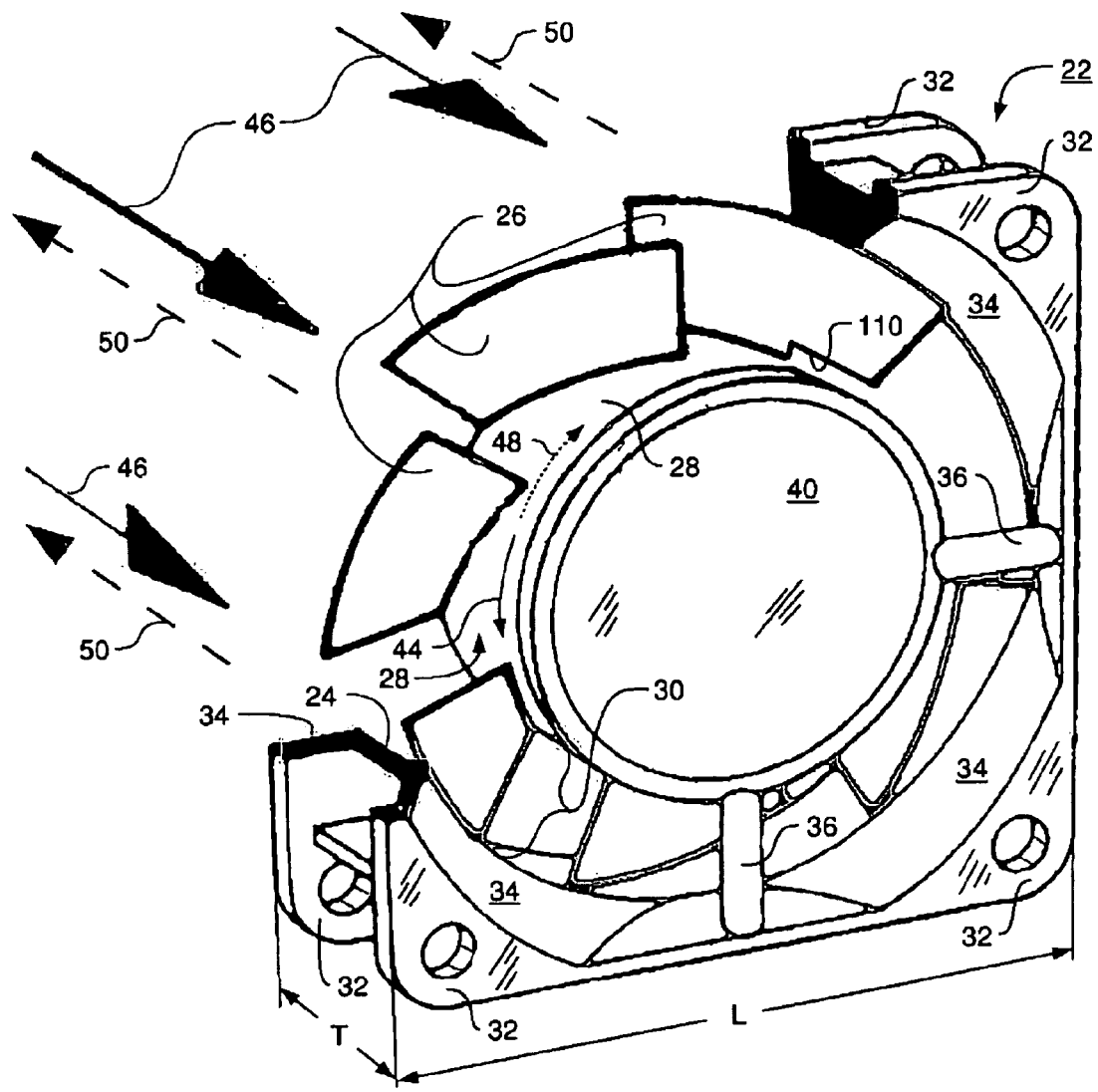
FIG. 1 is a greatly enlarged schematic depiction of a miniature axial fan 20.

FIG. 1 shows, schematically and greatly enlarged, a miniature fan 20. The latter has a fan housing 22 of a design known in principle, which is depicted partially in section. It has a cylindrical inner side 24 inside which rotate fan blades 26 that are arranged on a fan wheel 28. An air conduit 30 extends between fan wheel 28 and cylindrical inner side 24. In this example, cylindrical inner side 24 expands outward in the form of conical segments 34 at the four corners 32 of fan housing 22, only three of which corners are depicted. It must be noted, however, that in miniature fans, cylindrical inner side 24 generally extends over the entire axial extent T of fan housing 22, i.e. conical segments 32 are usually absent therefrom for space reasons (cf. FIG. 2).

Figure 2:
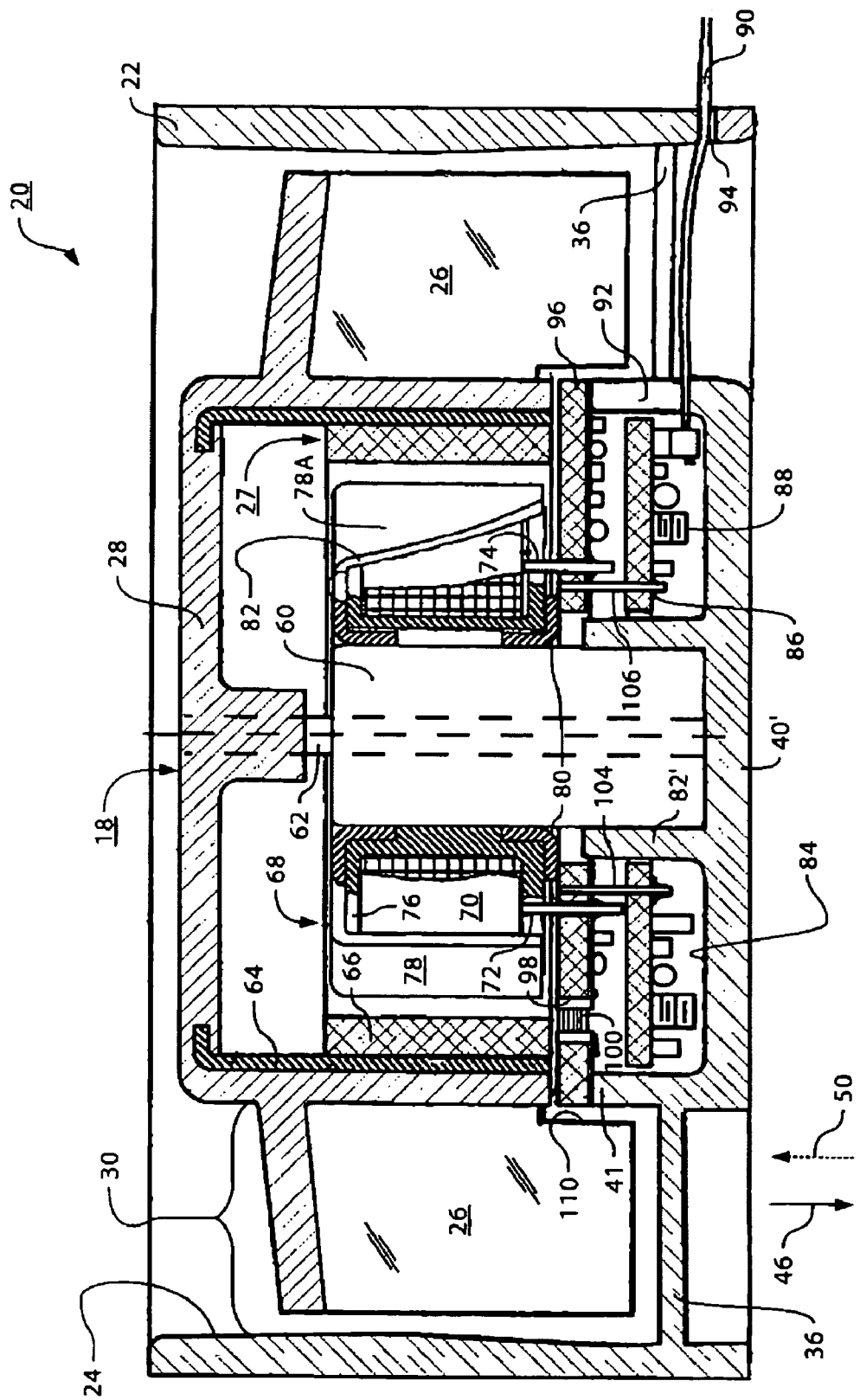
FIG. 2 is a greatly enlarged axial section through a miniature axial fan.

Connected to outer fan housing 22 via struts or spokes 36 is a support flange 40 on which is mounted an electronically commutated motor (FIG. 2) that serves to drive fan wheel 28 and is depicted in FIG. 2.

If fan wheel 28 rotates in the direction of an arrow 44, i.e. counter-clockwise, fan 20 then delivers air in the direction of arrows 46, i.e. from left to right in FIG. 1; and if fan wheel 28 rotates clockwise, i.e. in the direction of an arrow 48, fan 20 then delivers air in the direction of arrows 50, i.e. from right to left in FIG. 1.

In miniature fans as well, this reversal of rotation direction requires a greater number of electronic components, which entails considerable difficulty due to the small size of such fans.

FIG. 2 shows an embodiment of a miniature fan 20 having two circuit boards. The same reference numbers as in FIG. 1 are used for identical or identically functioning parts. Fan 20 according to FIG. 2 has no corner expansions 34, but instead its inner side 24 is substantially continuously cylindrical. The fan is driven by an electronically commutated motor 18.

Mounted in this inner side via struts 36 is a support flange 40' that is longer than flange 40 of FIG. 1. A bearing arrangement 60 is provided at the center of flange 40', said arrangement serving to journal rotation shaft 62 of fan wheel 28 arranged on the outer side of rotor 27, and being indicated only very schematically. There are numerous solutions in the existing art for bearing assembly 60 and for rotation shaft 62, and for their manner of mounting on rotor 27. The depiction in FIG. 2 is therefore very schematic.

An approximately cup-shaped magnetic yoke plate 64 is arranged in rotor 27, usually during the manufacture of fan wheel 28. Fan wheel 28, together with its fan blades 26, is usually manufactured from plastic by injection molding. Mounted on the inner side of yoke plate 64 in rotor 27 is a permanent-magnet arrangement, here in the form of a radially magnetized permanent magnet 66. Alternatively, for example, individual magnets could also be used here. This ring 66 can have, for example, two or four magnet poles, which are not depicted. This permanent-magnet ring 66 interacts magnetically with a claw pole internal stator 68 in whose interior a winding arrangement 70 is located. In the simplest case, this winding arrangement 70 contains an annular coil having two electrical terminals 72, 74. Winding arrangement 70 is wound onto a coil former 76. The latter is in turn retained between an upper claw pole piece 78 and a lower claw pole piece 80.

As FIG. 2 shows, the individual claw poles 78A can have on one side an oblique edge 82 in order to generate, in interaction with the magnet poles of permanent-magnet ring 66, a reluctance torque of suitable shape that serves, among other purposes, to rotate ring magnet 66, in the currentless state, into a position from which starting is possible without difficulty. There are numerous and detailed examples of this in the literature.

Claw pole pieces 78 and 80 are mounted on flange 40' in suitable form, e.g. on bearing arrangement 60 which in turn can be mounted in an axial projection 82' from flange 40'.

Formed in flange 40' is an annular recess or opening 84 which is made sufficiently large that at least a first, annular circuit board 86 can be accommodated in it; electronic components 88 are arranged on said board, and from it an electrical connector lead 90 of fan 20 is guided outward through an opening 92 of fan flange 40' and through an opening 94 of fan housing 22. Lead 90 serves to control fan 20 and to deliver current to it.

Located above circuit board 86, between upper edge 41 of fan flange 40' and the lower end of fan wheel 28, is a second circuit board 96 that has an opening 98 in which a galvanomagnetic rotor position sensor 100 is arranged, specifically below rotor magnet arrangement 66, so that said sensor 100 is located in the region of the leakage field of rotor magnet arrangement 66 and is controlled by said leakage field. Sensor 100 is normally a Hall Integrated Circuit (IC), but there are also other possibilities for it (e.g. a Giant Magneto Resistor or GMR).

Connector pins are soldered into second circuit board 96; these serve for electrical connection between terminals 72, 74 of annular coil 70 and the components on second circuit board 96. Extending similarly between first circuit board 86 and second circuit board 96 are connecting pins 104, 106 for electrical connection between said circuit boards. Alternatively, an electrical plug connection (not shown) can also be provided there, or e.g. a wire, stranded-wire, or foil connection.

The use of two circuit boards 86, 96 makes it possible to provide an electronic regulation or control system directly in the fan, even if the latter is very small, since the space for electronic components is correspondingly enlarged. As a result of the increased axial extent T (FIG. 1) of fan 20, fan blades 26 can be made correspondingly longer; they must maintain a small spacing 110 from fan flange 40' in the latter's vicinity. As a result of this, an elevated air delivery volume and a greater air pressure buildup are obtained.

More than two circuit boards can of course also be used, in which case the axial length T of fan 20 is then correspondingly increased.

Figure 3:
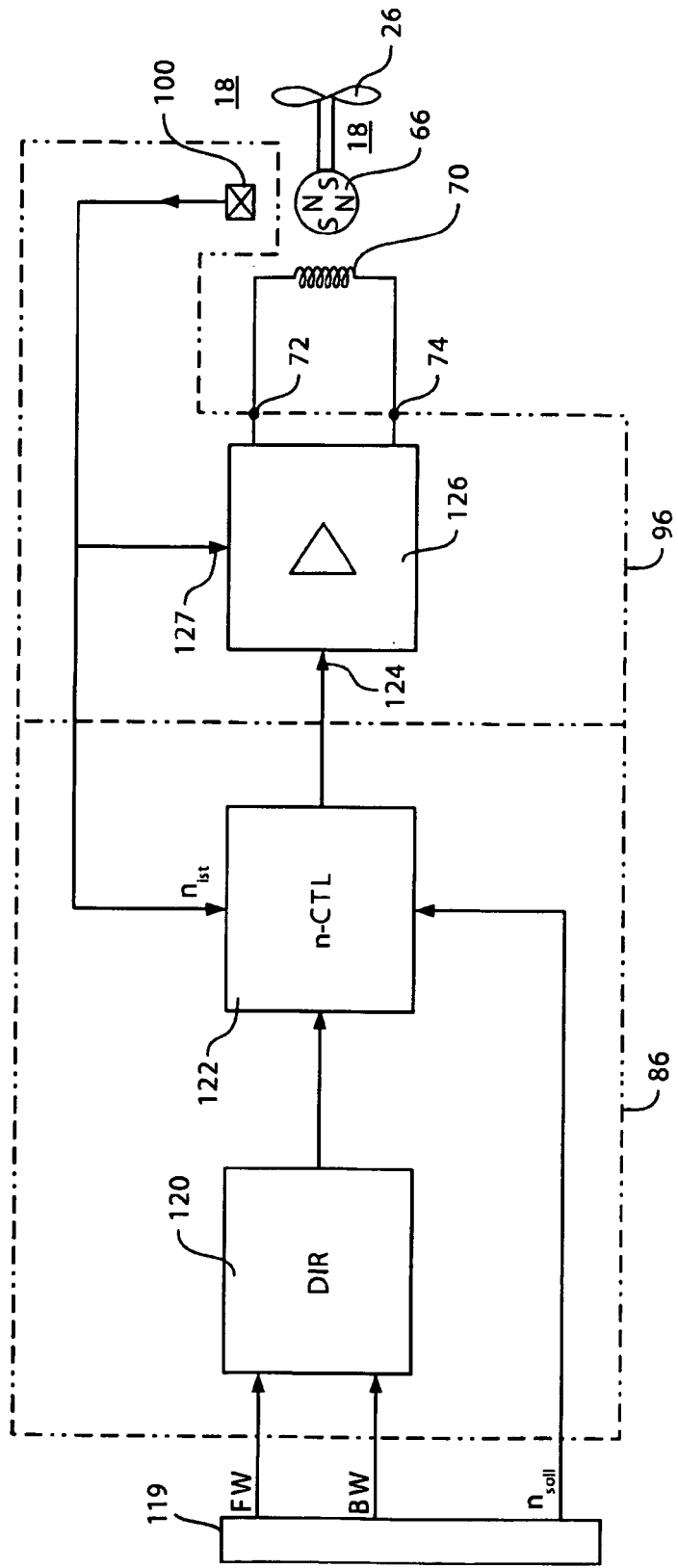
FIG. 3 schematically depicts a circuit arrangement for operating the miniature fan according to FIG. 2.

FIG. 3 shows a preferred circuit for fan 20 of FIG. 2. The fan has a circuit 119 for generating control signals FW, BW to specify whether the fan is to run forward or backward, which signals are applied to a directional controller 120, and a target rotation speed signal $n_{soll}$ which is applied to a directional controller 122. The output signal of directional controller 120 is also applied to the rotation speed controller n_CTL 122, along with the target rotation speed signal n_soll and the actual rotation speed n_ist of fan 20. This controller 122, which can be, for example, a P (Proportional) controller, a PI (Proportional Integral) controller, or a PID (Proportional Integral Differential) controller, generates at its output 124 a control output signal that is delivered to a power stage 126, to whose outputs 72, 74 the winding arrangement 70 of internal stator 68 of motor 18 is connected.

Rotor magnet 66 drives fan wheel 28, to which fan blades 26 are attached, and generates, by interaction with Hall IC 100, the actual speed signal n_ist that is also applied to an input 127 of output stage 126, in order to control commutation in the motor winding.

It is very advantageous that internal stator 68 can be combined with circuit boards 86 and 96 into one physical unit that, after electrical assembly thereof, can be integrated with fan flange 40'.

Fan wheel 28 is then journaled with its shaft 62 in bearing arrangement 60, thereby automatically creating the operative connection between rotor magnet 66 and Hall IC 100, so that no special assembly steps are necessary for this.

As FIG. 3 shows, the components can advantageously be distributed so that those components 72, 74, 100, 127 associated directly with motor 18 are arranged predominantly on circuit board 96 next to the motor, and those components 88, 120, 122 that belong to a higher-order control system, e.g. to controller 120 for the rotation direction or to rotation speed controller 122, are arranged on the lower circuit board 86.

This makes possible a modular configuration, i.e. upper circuit board 96 can be adapted or matched to the power output, operating voltage, etc. of motor 18, and lower circuit board 86 enables the implementation of a variety of functions, e.g. a rotation speed controller 122 or rotation direction controller 120.

Many further variants and modifications are of course possible within the scope of the present invention.

What is claimed is:

1. A miniature fan, comprising
an electronically commutated drive motor (18) with an internal stator (68) equipped with a stator winding arrangement, and an external rotor (27) connected to a central shaft (62),
on which external rotor is provided a permanent-magnet arrangement (66) that is in interaction with the internal stator (68),
on which external rotor (27) is arranged a fan wheel (28) that is equipped with fan blades (26),
further having a flange (40') carrying a projection (82) for receiving a bearing tube (60) adapted for rotatably journaling said central shaft (62) of the external rotor (27), said bearing tube (60), in turn, supporting said internal stator (68),
said internal stator (68) carrying, on its side facing the flange (40'), a first circuit board (86) bearing a Hall element (100) for control by said permanent-magnet arrangement (66) of the external rotor (27);
a second circuit board (96) being provided,
said flange (40') defining a cavity (84) that serves to receive said first circuit board (86) equipped with electronic components, said cavity being provided in a boundary region between the flange (40') and the electronically commutated drive motor (18),
the second circuit board (96) carrying at least one galvanomagnetic sensor (100) which is configured to sense a magnetic field acting, from the permanent-magnet arrangement (66) of the external rotor (27), on an associated point on the stator (68), the axial extent of the fan blades (26) being dimensioned such that at least a portion of each fan blade extends from the fan wheel (28) to an outer region of the flange, in order to improve the volumetric air flow (V/t) and the differential air pressure ($\Delta p$) generated by the fan (20);

the first circuit board (86) being electrically and mechanically connected to the second circuit board (96) via associated first connecting pins (104, 106);

the second circuit board (96) being electrically and mechanically connected to the internal stator (68) via associated second connecting pins (72,74), so that the bearing tube (60) and the circuit boards (89,96) can first be assembled together, before subsequent mounting into said fan (20) by inserting the bearing tube into said projection (82) of the flange (40').

2. The miniature fan of claim 1, further comprising a fan housing (22) whose external dimensions are in the range from approximately 20×20 mm to approximately 60×60 mm.

3. The miniature fan according to claim 1, wherein the electronically commutated motor is implemented as a claw pole external-rotor motor.

4. The miniature fan of claim 1, wherein the fan is configured as an axial fan.

\* \* \* \* \*